United States Patent Office 3,397,257
Patented Aug. 13, 1968

3,397,257
METHOD OF FORMING SPHEROIDS OF PARTICULATE, AGGLOMERATION-RESISTANT REFRACTORY METAL OXIDES
Giovanni Brambilla, Lecco, and Dino Neri, San Donato Milanese, Italy, assignors to SNAM Progetti S.p.A., Milan, Italy, a company of Italy
No Drawing. Continuation-in-part of application Ser. No. 418,899, Dec. 16, 1964. This application Sept. 6, 1966, Ser. No. 577,190
Claims priority, application Italy, Jan. 21, 1964, 1,423/64; Jan. 18, 1966, 13,520/66
10 Claims. (Cl. 264—.5)

ABSTRACT OF THE DISCLOSURE

Generally spherical aggregates of agglomeration-resistant particles of metal oxides are prepared by mixing water-soluble resin whose viscosity increases in the presence of alkali into an aqueous solution of salt of the metal that is precipitated by basic medium and then feeding droplets of that solution into an aqueous alkaline solution.

---

This is a continuation-in-part of our pending application Ser. No. 418,899, filed Dec. 16, 1964, now abandoned.

This invention relates to the preparation of small, generally spherical aggregates, or balls, of refractory material and aims to provide an improved method of forming spheroids of particulate, agglomeration-resistant refractory metal oxides.

In the past, small balls of metal oxides have been produced by the "sol-gel" method wherein a colloidal solution of the metal compound is sprayed or dropped in an appropriate organic solvent which causes gelification in the shape of spherical particles. It is also known that spheres or balls that may contain up to 10% of uranium can be prepared by slowly evaporating colloidal solutions of thorium hydroxide and then treating mechanically the solid phase that has remained so as to obtain a rounding by friction. Also, small balls have been prepared by spraying a colloidal solution of thorium hydroxide to which uranyl nitrate has been added in an ammonia atmosphere. Small balls of metal oxides having good regularity of spherical shape with diameters which are variable over a fairly wide range have been prepared by mechanical means involving the pressing of powders, crushing, screening, rounding and sintering. However, the past methods of preparing such balls or spheroids have been complex or wasteful, or both, and the cost of the resulting product has been excessive.

We have discovered that small, generally spherical aggregates, or balls, of particles of metal oxides that are resistant to agglomeration can be prepared in a relatively simple and inexpensive manner. In the practice of our invention, a solution (which may be of colloidal nature) of the metal salt or salts under treatment is mixed with a resin whose viscosity is increased by virtue of the action of alkalis. Such a mixture is fed in droplets into an aqueous alkaline solution and on contact with the aklali the external surface of each droplet becomes of such consistency that it retains its spherical shape when it reaches the bottom of the vessel containing the aqueous alkaline solution. Then, the base diffuses into the interior of the spheroid, causing its complete gelification. The spheroids so obtained are preferably aged in the solution in which they were formed, or in another fresh solution, and they are then dried or calcined. Advantages that are realized through the practice of our invention include the following:

(1) When spheroids comprised of a mixture of oxides (e.g., uranium oxide and thorium oxide) are to be prepared, there is no limit to relative proportions of the components;

(2) The spheroids are of regular geometrical shape;

(3) Spheroids of elevated density can be produced at comparatively low calcination temperatures;

(4) It is possible to vary the diameters of the spheroids within a fairly wide range;

(5) It is possible to treat solutions of metal compounds which are only obtainable with difficulty, if at all, in colloidal solution provided the metal compounds precipitate in a basic medium;

(6) It is possible to employ a wide range of concentration of solutions of metal compounds; and (7) The spheroids are of a high degree of purity since all of the steps of the process occur in aqueous solution and it is possible to remove water-soluble by-products.

The metal oxides that may be formed into spheres through the practice of our invention are those whose properties are such that they are precipitated in a basic medium, i.e., in ammonia or akali metal hydroxide solution. They include those reported in "Outlines of Methods of Chemical Analysis," John Wiley & Sons, Inc., New York (7th printing), pages 56–57 and 82. The elements are: beryllium, scandium, yttrium, lanthanum and other rare earths having an atomic number ranging from 58 to 71, actinium, titanium, zirconium, hafnium, thorium, columbium, tantalum, praseodynium, uranium, chromium, iron, aluminum, gallium, indium, thallium, tin, plutonium, cobalt, manganese, nickel, copper, silver, cadmium and zinc. The oxides of such metals can be treated alone or in admixture with one another.

It is a particular feature of our invention that it makes possible the preparation at relatively low cost and in preferred form of aggregates of particles of nuclear fuels, e.g., uranium oxide, thorium oxide and mixtures thereof. Thus, the absence of limitations on the concentration of the solution of metal salt or salts that is treated pursuant to our invention, which is one of the many advantages of our new method, permits, for instance, the production of small spheres of pure $UO_2$ and of mixtures of $UO_2$ and $ThO_2$ in any proportion not possible by earlier methods. Furthermore, the regularity of the geometrical shape and the high density of our spheroids improves their capacity of retaining fission gases and mechanical strength; and the possibility of varying the diameter of the spheroids at will makes it possible to produce spheroids having a greater range of granule size than was possible by previous chemical methods.

Furthermore, it is possible, pursuant to our invention, to treat solutions of non-colloidal metal compounds, and to utilize as starting materials many which could not be employed in prior art processes; thus, solutions of hexavalent uranium salts can be employed directly without reducing them to the tetravalent form. Since our invention permits treatment of salt solutions of relatively low concentration, it is not necessary to resort to expensive concentration processes and, in the case of preparing spheroids suitable as nuclear fuels, solutions thereof can be used as they come from the reprocessing plants.

Resins which can be employed in carrying out our new method are those which, as aforesaid, are water-soluble and increase in viscosity as a result of the action of alkalis. Of these, it has been our experience that hydroxy-propylmethyl-cellulose yields the best results. In most cases, it was found advantageous to add to the metal salt-resin water solution a compound capable of modifying the surface tension and the viscosity of the solution: e.g., those water-soluble compounds which present at least one alcoholic function. The alcohols, both univalent and polyvalent belong to that series of compounds. Among the univalent alcohols, ethyl alcohol and isopropyl alcohol are particularly useful. Among the bivalent alcohols are the glycols, preferably those having the general formula:

where $n$ represents generally 0, 1, 2, 3 or 4.

Among the trivalent alcohols, the glycerines are commonly the most useful.

The alcohols of the etherocyclic series also give excellent results; in particular those having the following formula:

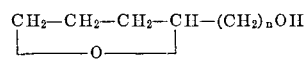

where $n$ represents 1, 2 or 3. Such alcohols, when presenting more than one alcoholic function, may be used also in the partially etherified form.

The basic medium for the gelification of the metal salt-resin water soluble may consist of alkaline metal hydroxide solution, ammonia solution, amine solution, hydrazine solution, hydroxyl amine solution, and the like.

For the production of spheroids according to our new process we start from the aqueous solutions of salts of the metals with which those spheroids are to be constituted. The solutions are salts containing anionic groups e.g., hydrochloric, nitric and so on of any type, provided they do not form complexes that are not precipitable with alkali. The working pH is not critical and its variations provoke only variations in the aging times. Therefore it may vary widely; the values have to be in any case lower than the ones for which the precipitation of the cations occur. There are added to said solution: (1) the compound that is adapted to effect the surface tension and the viscosity, and (2) the resin (adapted to give consistency to the spheroids). Thereafter, this solution is fed in droplets, as by dripping, into the alkali.

The particular alkali used is only governed by the type of cation which is to be precipitated, and in this choice, account should be taken of the possibility of easily removing said alkali by simple washing or by thermal decomposition. Without limiting in any way the choice, it will be noted that, among said alkalis, ammonia is recommended for the known advantages it presents, e.g., simplicity of use and ease of removal, either by washing or by decomposition, of the compounds eventually formed.

The concentration of the solution of metal salt or salts to be treated may vary over a broad range. A minimum value may be set at 10 g./l. (expressed as metal oxide), while the upper limit is the saturated concentration. The resin is added to the solution in an amount of 0.5 to 5 g./100 ml. The alcohol is used in a concentration of at least 5% by volume of the solution that is to be fed in droplets to the alkali and is preferably added before the resin. As a rule, it is not necessary to use an excess of 50% by volume of alcohol.

It will be appreciated that in the practice of our invention, inert materials may be added to the metal salt solution treated in the preparation of spheroids and that such inert materials may be removed in the sintering phase to give a controlled porosity to the spheroids.

In order that our invention will be fully available to those skilled in the art, the following specific examples thereof are given:

EXAMPLE I

(1) Preparation of the solutions

*(1-1) Preparation of the uranium solution.*—Uranium should be in the tetravalent form of $UCl_4$ that is prepared by attacking metallic uranium in chips with concentrated HCl. From the solution, the excess of HCl is removed by cautious evaporation. A series of tests were carried out with solutions having a $UO_2$ concentration of 150 to 250 g./litre and pH 0.2 to 1.

*(1-2) Preparation of the thorium solution.*—Thorium hydroxide obtained by precipitation of the nitrate with ammonia, is dissolved in HCl. In this case tests were carried out with a $ThO_2$ concentration of from 150 to 250 g./litre and pH 1 to 3.

*(1-3) Preparation of the solution of uranium and thorium.*—The above described solutions are mixed in desired proportions in such a way as to get a total concentration (expressed in terms of $UO_2+ThO_2$) of from 150 to 250 g./litre and pH 1 to 2.

It should be borne in mind that the above is reported by way of mere example, so for instance the values of the concentrations may be varied while taking into account at any rate that too much diluted solutions cause excessive shrinking during drying and, therefore, breakage of the spheroids whilst with too much concentrated solutions the dripping operation becomes difficult.

(2) Mixing with resin

There was employed a resin based on hydroxypropyl methyl cellulose stabilized with polyethylene glycol. That resin is dissolved in the solution by means of vigorous stirring in the proportion of 0.8 to 1.5 g. per 100 ml. of solution.

(3) Dripping

The solution was fed in droplets from a separating funnel with an end drawn out into a capillary (diameter of the hole, about 1 mm.). The droplets were formed by falling into a tube 30 to 50 cm. high containing an alkali solution. It is possible and useful to employ different bases such as NaOH, $NH_4OH$, hydrazine, hydroxyl amine, monoethanolamine and the like and preferably NaOH having a concentration of from 150 to 350 g./litre. A path of about 30 cm. suffices for the consolidation of the droplets, the geometry of which improves during the fall.

(4) Drying and calcining

The spheroids are left for a certain time in the solution in which they were formed and are subsequently washed with water and dried at 80–100° C.; during the drying, a shrinkage of about 50% is noted. The spheres are finally calcined by subjecting them to a controlled gradual heating of from 1000 to 1300° C. In the case of carbides, the calcination is carried out in vacuo at a temperature higher than 1600° C. The mode of operation of these last stages considerably influences the yield of the process; the values of the yields obtained by us have always been higher than 50% at any rate. The spheres so obtained have a final diameter of about 1 mm. but lower or higher diameters can be obtained by controlling the dripping speed, the viscosity and the density of the solutions. From the above, the following advantages appear besides those already mentioned:

Simplicity of operation and tooling, which is particularly appreciable if radioactive material is to be handled;
Possibility of utilizing other elements, or elements with different isotopic composition, such as for instance enriched plutonium and uranium;
Possibility of producing carbides of thorium, uranium and plutonium by means of the addition of powdery carbon to the solutions of said metals;
Possibility of obtaining spheres of a material in which the fuel is dispersed in a matrix of oxides (e.g., BeO, $Al_2O_3$( MgO) or carbides (e.g., SiC).

EXAMPLE II

Preparation of spheres starting from hexavalent uranium

An aqueous solution is prepared adding successively:

Uranyl chloride or uranyl nitrate solutions having pH 1;
30% by volume of propylene glycol per volume of solution;
1% by weight of methyl-propyl-cellulose per volume of solution.

In this test, there is a final concentration of this solution of 150 gr./l. expressed as $UO_2$.

Said solution is dripped through a capillary into an aqueous solution of 30% ammonia.

The spheroids of ammonium uranate are aged in the same solution for a suitable time and thereafter washed. Successively, with suitable methods, the spheroids are dried, calcined and baked to reach the desired densities in a suitably controlled atmosphere.

Preparation of $ThO_2 + UO_2$ spheres

Aqueous solutions of thorium nitrate and of uranyl nitrate, both in stoichiometric ratio metal:acid, are mixed in the desired proportions and thereafter added successively and mixed by stirring: 20% by volume of ethylene glycol monomethyl ether per volume of solution; 0.8% by weight of methyl-propyl-cellulose per volume of solution.

In this test there is final concentration of 130 gr./l. expressed as $ThO_2 + UO_2$ and a content of $UN_2$ equal to the 16% of the total.

The solution is dropped through a capillary into an aqueous solution of 33% ammonia.

The spheres consisting of hydrate of thorium and ammonium uranate are aged in the same solution or in a fresh solution, then are washed, dried and calcined up to reach the desired density in a suitably controlled atmosphere.

EXAMPLE III

A solution containing 300 gr./l. (as $ZrO_2$) is prepared by dissolving $ZrOCl_2 \cdot 8H_2O$ in water. The pH of this solution was about 1. To this solution is added an equal volume of 2% cellulosic resin water solution. The resulting solution after stirring was dropped through a capillary, for instance an hypodermic needle, into a basic medium consisting of a 10% $NH_3$ solution.

The spheroids obtained by gelification are allowed to stand for three hours for suitable aging.

After being washed and dried the spheroids undergo the conventional thermal treatments for use as sintered ceramic material.

EXAMPLE IV

The following example shows the possibility of preparing composite spheres starting from water solutions of two different cations and different anions.

A solution of zirconium and chromium ions was prepared by dissolving in water $Zr(NO_3)_4 \cdot 5H_2O$ and $CrCl_3 \cdot 6H_2O$ so that the solution contained 300 gr./l. (as $Cr_2O_3 + ZrO_2$) wherein $Cr_2O_3$ was 15% of the total amount of oxides. The pH of the solution was 0.5. The solution so obtained was mixed with an equal volume of a 2% water solution of cellulosic resin.

The resulting viscous solution was dropped through a capillary tube into a 15% ammonia solution.

The spheroids after gelification were recovered from the gelling solution and aged for two hours in a 32% ammonia solution.

After being washed and dried the spheroids undergo the conventional thermal treatments.

EXAMPLE V

A 200 g./l. solution (as $Fe_2O_3$) was prepared by dissolving $FeCl_3 \cdot 6H_2O$ in water.

To this solution an equal volume of the resin solution of the preceding example was added.

The resulting viscous solution was dropped through a capillary tube into a gellification medium consisting of 8% sodium hydroxide solution.

The spheroids obtained were aged for two hours and a half. After being washed and dried the spheroids were subjected to the above-mentioned thermal treatment.

EXAMPLE VI

To a thorium nitrate solution (50 g./l. expressed as $ThO_2$, i.e., a concentration comparable with the lower ones obtainable from the "Reprocessing Plant") having a free $HNO_3$ acidity of 0.5 M (M=molar) was added the same solid resin of the preceding examples in such an amount to give a concentration of 0.6 g./100 ml. The mixture was vigorously stirred until dissolution was complete. The resulting viscous solution was dropped into a 7% NaOH solution. The resulting spheroids, after aging, washing, drying and conventional thermal treatment, were of a density which was 97% of theoretical.

EXAMPLE VII

This example shows the possibility of working at high concentration and at negative pH values.

To a $UO_2(NO_3)_2$ solution (450 g./l. expressed as $UO_2$), nitric acid was added in order to obtain a 1.5 M concentration of free acid. Hydroxypropyl-methyl-cellulose, 0.85 g./100 ml. and 20% by volume of the alcohol of the Example II, was added to the solution. The viscous solution was dropped through a 2.3 mm. capillary into a 30% ammonia solution taking care to eliminate with a continuous air jet the ammonia vapors which would gel the drops on the capillary. After having undergone the conventional washing, drying and thermal treatments, the spheroids had a diameter of 900 microns with a density of 97.8% of theoretical.

EXAMPLE VIII

A solution containing $Th(NO_3)_4$, $UO_2(NO_3)_2$ and $Ce(NO_3)_3$ having a total concentration (expressed as $ThO_2 + UO_2 + Ce_2O_3$) of 300 g./l. and an oxide ratio: 60:35:5 was prepared.

The solution, mixed with resin as in the preceding examples, was dropped into an ammonia solution, and the resulting collected spheroids had a density of 97.2% of theoretical.

EXAMPLE IX

A $UO_2(NO_3)_2$ solution was acidified with nitric acid to a free acid concentration of 2 M and a solution of $Pu(NO_3)_4$ in nitric acid 2 M was added thereto. The total salt concentration (expressed as $PuO_2 + UO_2$) was 150 g./l. wherein $PuO_2$ was 5% of the oxide mixture. The solution thus obtained was then mixed together with the resin and the alcohol as in Example II, and dropped into a 15% ammonia solution. After aging and washing, spheroids whose density was 97.5% of theoretical were collected.

EXAMPLE X

This and the subsequent examples show the possibility of starting from colloidal solutions of the metal compounds:

$ThO_2$, obtained by roasting at 200° C.

$$Th(NO_3)_4 \cdot 4H_2O$$

was peptized in nitric acid and a colloidal solution of 100 g./l. (expressed as $ThO_2$) was obtained at pH 0.8.

To the solution, the cellulosic resin was added in an amount of 0.8 g./100 ml. and the mixture was thoroughly stirred until dissolution was complete, the resulting viscous solution, divided in four portions, was dropped, respectively, into the following basic solutions:

(1) $NH_4OH$ (15)
(2) Monomethylamine (15)
(3) KOH (8)
(4) NaOH (8)

A needle was employed with a bore diameter of 0.9 mm. after aging and conventional washing and thermal treatments, spheroids with a diameter of 810±5 microns were collected with a density equal to 96.9% of theoretical.

EXAMPLE XI

A colloidal solution of cerium was prepared by precipitating $Ce(OH)_4$ which, after washing, was peptized with a small amount of ceric nitrate solution. The colloidal solution had a $NO_3/Ce$ ratio of 3 (i.e., lower than the stoichiometric).

Said solution was mixed with an equal volume of a water solution of cellulosic resin (g./100 ml. then dropped into a 20% ammonia solution.

The spheroids, after the conventional treatment, had a viscosity value equal to 97.6% of theoretical.

EXAMPLE XII

Proceeding as in Example IX, but employing a colloidal solution of $Pu(NO_3)_4$ (obtained by dissolving in a small amount of $HNO_3$ a freshly precipitated plutonium hydroxide), spheroids of $UO_2+PuO_2$ were prepared whose density value was 98.1% of theoretical.

What is claimed is:

1. The method of preparing small generally spherical aggregates comprising agglomeration-resistant particles of refractory metal oxide which comprises, admixing with an aqueous solution of a salt of a metal that is precipitated by a basic medium a water-soluble resin that increases in viscosity in the presence of alkali, feeding the resultant solution in droplets into an aqueous alkaline solution so that regular spheroids are formed therefrom, and then drying and calcining said spheroids.

2. A method according to claim 1 wherein said aqueous solution includes more than one metal salt.

3. A method according to claim 1 wherein said metal is selected from the group consisting of beryllium, scandium, yttrium, lanthanum and other rare earths having an atomic number ranging from 58 to 71, actnium, titanium, zirconium, hafnium, thorium, columbium, tantalum, prasedynium, uranium, chromium, iron, aluminum, gallium, indium, thallium, tin plutonium cobalt, manganese, nickel, copper silver cadmium and zinc and mixtures thereof.

4. A method according to claim 1 wherein the concentration of metal compound in said aqueous solution is at least 10 g. of metal (expressed as metal oxide) per liter of solvent.

5. A method according to claim 1 wherein said resin is hydroxypropyl-methyl-cellulose.

6. A method according to claim 1 wherein the concentration of resin in said solution is 0.5–5 g./100 ml.

7. A method according to claim 1 wherein said solution contains a compound, having at least one alcoholic function, adapted to modify the surface tension and viscosity of said solution.

8. A method according to claim 7 wherein said compound is selected from the group consisting of univalent and polyvalent alcohols.

9. A method according to claim 8 wherein the concentration of alcohol in said solution is from about 5% to about 50% by volume.

10. A method according to claim 1 wherein particles of compounds selected from the group consisting of uranium oxide, thorium oxide and mixtures thereof are precipitated from said aqueous solution to provide spheroids adapted for use as nuclear fuel.

References Cited

UNITED STATES PATENTS

| | | | |
|---|---|---|---|
| 2,769,780 | 11/1956 | Clifford et al. | 252—301.1 |
| 3,035,895 | 5/1962 | McCorkle et al. | 252—301.1 |
| 3,171,715 | 3/1965 | Kleinstenber | 252—301.1 X |
| 3,171,815 | 3/1965 | Kelly et al. | 252—301.1 |
| 3,211,518 | 10/1965 | Acker et al. | 252—301.1 |
| 3,262,760 | 7/1966 | Morse et al. | 252—301.1 X |
| 3,264,379 | 8/1966 | Hammer et al. | 252—301.1 X |

CARL D. QUARFORTH, *Primary Examiner.*

S. J. LECHERT, JR., *Assistant Examiner.*